March 4, 1930.   H. C. FERRIS   1,749,632
ORTHODONTIC DUMB BELL
Original Filed May 11, 1928
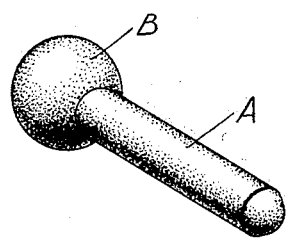
WITNESSES
INVENTOR
Henry C. Ferris
BY
ATTORNEY Patented Mar. 4, 1930

1,749,632

UNITED STATES PATENT OFFICE

HENRY C. FERRIS, OF GARDEN CITY, NEW YORK

ORTHODONTIC DUMB-BELL

Application filed May 11, 1928, Serial No. 276,959. Renewed January 21, 1930.

This invention relates to dental implements or accessories, and has particular reference to an exercising device for use in connection with that branch of dentistry known as orthodontia which pertains to the treatment of irregularities of the teeth.

It has been observed that straightening of the teeth by wire springs subjects the patient to pain and discomfort mainly due to the fact that blood circulation is impaired, and the present invention among other objects comprehends an implement or device which is designed to be chewed upon to serve in the capacity of an exerciser for promoting proper blood circulation.

The invention further contemplates an orthodontic dumb-bell serving as an accessory employed in connection with a course of scientific treatments for the proper development of the human maxillary and mandibular bones, which implement is used to exert predetermined functional pressures for increasing blood circulation.

The invention aims as a still further object to provide an instrumentality for aiding in the proper development of the elevating and triturating muscles of the mandible, thereby producing an indirect stimulation of the blood circulation to the bones of the face and cranium, as well as to the thyroid glands.

More specifically, the invention comprehends an implement possessing suitable yieldable, elastic qualities and including a cylindrical shank, the size of which permits trituration in rotary motion when masticated upon.

The invention additionally embodies an implement which further includes a spherical or ball shaped knob at one end of the shank which is so proportioned as to meet the requirements of the average normal development of the premaxillary bones of the growing child, its particular function residing in its use as a means for exerting an outward pressure on teeth which have a tendency toward lingual inclination.

As a still further object, the invention resides in the use of a material which in addition to possessing the required elastic quality and the desired resistant tension, is of a sufficiently tough texture so as not to be readily subject to permanent distortion or abrasion by its ordinary use.

Other objects reside in the simplicity of its construction and mode of use, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawing:

The figure is a perspective view of the device or implement.

Referring to the drawing by characters of reference, the device or implement consists of a shank A which is of cylindrical formation and which shank carries at one end a spherical knob or head B of greater diameter than the shank and preferably integrally formed therewith. The head or knob as well as the shank are of a material which is yieldable and elastic to the desired degree to lend to the device a suitable resistant tension when compressed. In practice, a special elastic rubber, very slightly vulcanized under a well known process, has been found to be the most suitable material for the purpose. In any event, the material used must in addition to its other properties, possess those qualities which render it, in its ordinary use, not readily subject to permanent distortion or abrasion.

For practical use, it is essential that the dumb-bell or device be made precisely in the following dimensions, namely, the shank is 47 millimeters long and 9 millimeters in diameter, while the spherical head or knob is 18.5 millimeters in diameter. Dimensions which materially deviate from those given will positively defeat the ends for which the instrument has been devised and will prevent proper functioning thereof when in use.

What is claimed is:

1. An orthodontic dumb-bell constructed of a temporarily deformable elastic material and comprising a cylindrical shank and an enlarged spherical head at one end thereof.

2. As a new article of manufacture, an orthodontic dumb-bell constructed of a temporarily deformable elastic material and comprising a cylindrical shank and an enlarged integral spherical knob at one end thereof.

3. As a new article of manufacture, an orthodontic dumb-bell comprising a cylindrical shank and an enlarged integral spherical knob at one end thereof constructed of a tough yieldable elastic material.

4. As a new article of manufacture, an orthodontic dumb-bell comprising a cylindrical shank and an enlarged integral spherical knob at one end thereof constructed of a tough yieldable elastic material such as slightly vulcanized rubber.

5. As a new article of manufacture, an orthodontic dumb-bell comprising a cylindrical shank 9 millimeters in diameter and 47 millimeters in length and a spherical knob of 18.5 millimeters in diameter at one end of the shank.

6. As a new article of manufacture, an orthodontic dumb-bell comprising a cylindrical shank 9 millimeters in diameter and 47 millimeters in length and a spherical knob of 18.5 millimeters in diameter at one end of the shank, the said shank and knob being preferably formed integral and of a tough yieldable elastic material such as slightly vulcanized rubber.

Signed at New York city in the county of New York and State of New York this fourteenth day of April A. D. 1928.

HENRY C FERRIS, D. D. S.